United States Patent
Zheng et al.

(10) Patent No.: US 12,246,739 B2
(45) Date of Patent: Mar. 11, 2025

(54) ADAPTIVE DRIVING STYLE

(71) Applicant: Honda Motor Co., Ltd., Tokyo (JP)

(72) Inventors: Zhaobo K. Zheng, San Jose, CA (US); Teruhisa Misu, San Jose, CA (US); Kumar Akash, Milpitas, CA (US)

(73) Assignee: Honda Motor Co., Ltd., Tokyo (JP)

( * ) Notice: Subject to any disclaimer, the term of this patent is extended or adjusted under 35 U.S.C. 154(b) by 179 days.

(21) Appl. No.: 17/883,540

(22) Filed: Aug. 8, 2022

(65) Prior Publication Data
US 2024/0043027 A1    Feb. 8, 2024

(51) Int. Cl.
*B60W 50/10* (2012.01)
*B60W 50/00* (2006.01)
*G05B 13/02* (2006.01)
*G05B 13/04* (2006.01)

(52) U.S. Cl.
CPC ......... *B60W 50/10* (2013.01); *G05B 13/0265* (2013.01); *G05B 13/04* (2013.01); *B60W 2050/0075* (2013.01); *B60W 2420/403* (2013.01); *B60W 2540/221* (2020.02); *B60W 2540/225* (2020.02)

(58) Field of Classification Search
CPC ......... B60W 50/10; B60W 2050/0075; B60W 2420/403; B60W 2540/221; B60W 2540/225; G05B 13/0265; G05B 13/04
USPC .......................................................... 701/27
See application file for complete search history.

(56) References Cited

U.S. PATENT DOCUMENTS

| | | | |
|---|---|---|---|
| 10,759,424 B2 | 9/2020 | Misu et al. | |
| 11,430,231 B2 | 8/2022 | Takamoto | |
| 11,538,259 B2 | 12/2022 | Martin et al. | |
| 11,577,722 B1* | 2/2023 | Packer | G05D 1/0088 |
| 12,005,922 B2 | 6/2024 | Misu | |
| 2015/0149017 A1 | 5/2015 | Attard et al. | |
| 2015/0291146 A1 | 10/2015 | Prakah-Asante et al. | |
| 2017/0031364 A1 | 2/2017 | Takahashi et al. | |
| 2017/0039890 A1 | 2/2017 | Truong et al. | |
| 2017/0088143 A1 | 3/2017 | Goldman-Shenhar et al. | |
| 2017/0136842 A1 | 5/2017 | Anderson et al. | |
| 2017/0267256 A1 | 9/2017 | Minster et al. | |
| 2018/0361972 A1 | 12/2018 | Zagorski | |

(Continued)

OTHER PUBLICATIONS

"Intelligent driver model." Wikipedia, Wikimedia Foundation, Published date Oct. 25, 2021 https://en.wikipedia.org/wiki/Intelligent_driver_model. Accessed date Oct. 25, 2021.

(Continued)

*Primary Examiner* — Krishnan Ramesh
(74) *Attorney, Agent, or Firm* — Rankin, Hill & Clark LLP

(57) ABSTRACT

According to one aspect, an adaptive driving style system may include a set of two or more sensors, a memory, and a processor. The set of two or more sensors may receive two or more sensor signals. The memory may store one or more instructions. The processor may execute one or more of the instructions stored on the memory to perform one or more acts, actions, or steps, including training a trust model using two or more of the sensor signals as input, training a preference model using the trust model and two or more of the sensor signals as input, and generating a driving style preference based on an adaptive driving style model including the trust model and the preference model.

15 Claims, 6 Drawing Sheets

(56) References Cited

U.S. PATENT DOCUMENTS

| | | |
|---|---|---|
| 2019/0071101 A1 | 3/2019 | Emura et al. |
| 2019/0094865 A1 | 3/2019 | Fletcher |
| 2019/0126914 A1 | 5/2019 | Nojoumian |
| 2019/0213429 A1 | 7/2019 | Sicconi et al. |
| 2019/0291728 A1 | 9/2019 | Shalev-Shwartz et al. |
| 2020/0216094 A1* | 7/2020 | Zhu ............... B60W 40/09 |
| 2020/0369268 A1 | 11/2020 | McGill et al. |
| 2021/0078608 A1 | 3/2021 | Misu |
| 2022/0126864 A1 | 4/2022 | Moustafa et al. |
| 2022/0324449 A1* | 10/2022 | Shi ............... B60W 50/08 |
| 2022/0324481 A1 | 10/2022 | Cheng et al. |
| 2022/0324490 A1* | 10/2022 | Akash ............ G06V 20/56 |
| 2022/0343762 A1 | 10/2022 | Alvarez et al. |
| 2022/0388543 A1* | 12/2022 | David ............ B60W 60/0051 |
| 2022/0396287 A1* | 12/2022 | Akash ............ B60W 50/14 |
| 2023/0109398 A1* | 4/2023 | Kranski ............ B25J 9/161 700/250 |
| 2023/0110713 A1* | 4/2023 | Degirmenci ........ G06N 3/0442 701/24 |
| 2023/0128456 A1 | 4/2023 | Natarajan et al. |
| 2023/0309053 A1* | 9/2023 | Kennouche ........ G01S 5/0294 |
| 2023/0341825 A1* | 10/2023 | Dabija ............ G05B 13/04 |
| 2024/0012992 A1* | 1/2024 | Tamm ............ G06F 16/9024 |
| 2024/0025404 A1* | 1/2024 | Gupta ............ B60W 50/10 |
| 2024/0177528 A1 | 5/2024 | Olin et al. |

OTHER PUBLICATIONS

Bellem, H., Thiel, B., Schrauf, M. and Krems, J.F., 2018. Comfort in automated driving: An analysis of preferences for different automated driving styles and their dependence on personality traits. Transportation research part F: traffic psychology and behaviour,55, pp. 90-100.

Ekman, F., Johansson, M., Karlsson, M., Strömberg, H. and Bligård, L.O., 2021. Trust in what? Exploring the interdependency between an automated vehicle's driving style and traffic situations. Transportation research part F: traffic psychology and behaviour, 76, pp. 59-71.

Hoffmann, Gabriel M., Claire J. Tomlin, Michael Montemerlo, and Sebastian Thrun. "Autonomous Automobile Trajectory Tracking for Off-Road Driving: Controller Design, Experimental Validation and Racing." American Control Conference. 2007, pp. 2296-2301. doi:10.1109/ACC.2007.4282788 http://ai.stanford.edu/~gabeh/papers/hoffmann_stanley_control07.pdf.

Körber, M., Baseler, E. and Bengler, K., 2018. Introduction matters: Manipulating trust in automation and reliance in automated driving. Applied ergonomics,66, pp. 18-31.

Lee, J.D., Liu, S.Y., Domeyer, J. and DinparastDjadid, A., 2019. Assessing drivers' trust of automated vehicle driving styles with a two-part mixed model of intervention tendency and magnitude. Human factors, p. 0018720819880363.

Ma, Z. and Zhang, Y., Dec. 2020, Investigating the Effects of Automated Driving Styles and Driver's Driving Styles on Driver Trust, Acceptance, and Take Over Behaviors. In Proceedings of the Human Factors and Ergonomics Society Annual Meeting (vol. 64, No. 1, pp. 2001-2005). Sage CA: Los Angeles, CA: SAGE Publications.

Treiber, Martin; Hennecke, Ansgar; Helbing, Dirk (2000), "Congested traffic states in empirical observations and microscopic simulations", Physical Review E,62(2): 1805-1824. (https://en.wikipedia.org/wiki/Intelligent_driver_model).

Treiber, M. and Kesting, A., 2013. Traffic flow dynamics. Traffic Flow Dynamics: Data, Models and Simulation, Springer-Verlag Berlin Heidelberg.

Walker, F., Verwey, W. and Martens, M., Jun. 2018, Gaze behaviour as a measure of trust in automated vehicles. In Proceedings of the 6th Humanist Conference (Jun. 2018).

N. Adnan, S. Md Nordin, M. A. bin Bahruddin, and M. Ali, "How trust can drive forward the user acceptance to the technology? Invehicle technology for autonomous vehicle," Transportation Research Part A: Policy and Practice, vol. 118, pp. 819-836, 2018. [Online]. Available: https://www.sciencedirect.com/science/article/pii/S0965856418309030.

F. Chollet et al., "Keras," 2015. https://keras.io/.

A. Dettmann, F. Hartwich, P. Roßner, M. Beggiato, K. Felbel, J. Krems, and A. C. Bullinger, "Comfort or not? Automated driving style and user characteristics causing human discomfort in automated driving," International Journal of Human-Computer Interaction, vol. 37, No. 4, pp. 331-339, 2021. [Online]. Available: https://doi.org/10.1080/10447318.2020.1860518.

L. Kleisen, The relationship between thinking and driving styles and their contribution to young driver road safety. University of Canberra Bruce, Australia, 2011.

D. Vaughan, Sep. 2022. [Online]. Available: https://cran.r-project.org/web/packages/yardstick/vignettes/multiclass.html.

C. Basu, Q. Yang, D. Hungerman, M. Sinahal, and A. D. Draqan, "Do you want your autonomous car to drive like you?" in 2017 12th ACM/IEEE International Conference on Human-Robot Interaction (HRI. IEEE, 2017, pp. 417-425.

J. K. Choi and Y. G. Ji, "Investigating the importance of trust on adopting an autonomous vehicle," International Journal of Human-Computer Interaction, vol. 31, No. 10, pp. 692-702, 2015. [Online]. Available: https://doi.org/10.1080/10447318.2015.1070549.

N. Dillen, M. Ilievski, E. Law, L. E. Nacke, K. Czarnecki, and O. Schneider, "Keep calm and ride along: Passenger comfort and anxiety as physiological responses to autonomous driving styles," in Proceedings of the 2020 CHI conference on human factors in computing systems, 2020, pp. 1-13.

A. Eugensson, M. Brännström, D. Frasher, M. Rothoff, S. Solyom, and A. Robertsson, "Environmental, safety legal and societal implications of autonomous driving systems," in International Technical Conference on the Enhanced Safety of Vehicles (ESV). Seoul, South Korea, vol. 334, 2013.

C. Gold, M. Körber, C. Hohenberger, D. Lechner, and K. Bengler, "Trust in automation—before and after the experience of take-over scenarios in a highly automated vehicle," Procedia Manufacturing, vol. 3, pp. 3025-3032, 2015.

M. Hasenjäger and H. Wersing, "Personalization in advanced driver assistance systems and autonomous vehicles: A review," in 2017 IEEE 20th International Conference on Intelligent Transportation Systems (ITSC), 2017, pp. 1-7.

A. Kesting, M. Treiber, M. Schönhof, and D. Helbing, "Extending adaptive cruise control to adaptive driving strategies," Transportation Research Record, vol. 2000, No. 1, pp. 16-24, 2007. [Online]. Available: https://doi.org/10.3141/2000-03.

R. Krueger, T. H. Rashidi, and J. M. Rose, "Preferences for shared autonomous vehicles," Transportation Research Part C: Emerging Technologies, vol. 69, pp. 343-355, 2016.

Epic Games. 2022. Unreal Engine. https://www.unrealengine.com/en-US/.

SAE. 2018. Taxonomy and Definitions for Terms Related to Driving Automation Systems for On-Road Motor Vehicles—SAE International. https://www.sae.org/standards/content/j3016_201806/.

Shubham Agrawal and Srinivas Peeta. 2021. Evaluating the impacts of driver's pre-warning cognitive state on takeover performance under conditional automation. Transportation Research Part F: Traffic Psychology and Behaviour 83 (Nov. 2021), 80-98. https://doi.org/10.1016/J.TRF.2021.10.004.

Kumar Akash, Wan-Lin Hu, Neera Jain, and Tahira Reid. 2018. A Classification Model for Sensing Human Trust in Machines Using EEG and GSR. ACM Trans. Interact. Intell. Syst. 8, 4, Article 8, 4 (2018), 1-20. https://doi.org/10.1145/3132743.

Kumar Akash, Neera Jain, and Teruhisa Misu. 2020. Toward Adaptive Trust Calibration for Level 2 Driving Automation. In ICMI 2020—Proceedings of the 2020 International Conference on Multimodal Interaction. Association for Computing Machinery, Inc, Utrecht, 538-547. https://doi.org/10.1145/3382507.3418885.

Bradley M. Appelhans and Linda J. Luecken. 2006. Heart Rate Variability as an Index of Regulated Emotional Responding:. https://doi.org/10.1037/1089-2680.10.3.229 10, 3 (Sep. 2006), 229-240. https://doi.org/10.1037/1089-2680.10.3.229.

Hanna Bellem, Thorben Schönenberg, Josef F. Krems, and Michael Schrauf. 2016. Objective metrics of comfort: Developing a driving

(56) References Cited

OTHER PUBLICATIONS style for highly automated vehicles. Transportation Research Part F: Traffic Psychology and Behaviour 41 (Aug. 2016), 45-54. https://doi.org/10.1016/J.TRF.2016.05.005.

Stephen M. Casner, Edwin L. Hutchins, and Don Norman. 2016. The challenges of partially automated driving. Commun. ACM 59, 5 (2016), 70-77. https://doi.org/10.1145/2830565.

Liang-Chieh Chen, Yukun Zhu, George Papandreou, Florian Schroff, and Hartwig Adam. 2018. Encoder-Decoder with Atrous Separable Convolution for Semantic Image Segmentation. In In Proceedings of the Eujropean conference on computer vision (ECCV). Springer Science & Business Media, Munich, 81-818. https://github.com/tensorflow/models/tree/master/.

Fredrick Ekman, Mikael Johansson, Lars-Ola Bligård, Marianne Karlsson, and Helena Strömberg. 2019. Exploring automated vehicle driving styles as a source of trust information. Transportation Research Part F: traffic psychology and behaviour 65 (2019), 268-279. https://doi.org/10.1016/j.trf.2019.07.026.

Yannick Forster, Johannes Kraus, Sophie Feinauer, and Martin Baumann. 2018. Calibration of trust expectancies in conditionally automated driving by brand, reliability information and introductionary videos: An online study. In Proceedings—10th International ACM Conference on Automotive User Interfaces and Interactive Vehicular Applications, AutomotiveUI 2018. Association for Computing Machinery, Inc, Pittsburgh, 118-128. https://doi.org/10.1145/3239060.3239070.

Sabu George, Manohara Pai, Radhika M Pai, and Samir Kumar Praharaj. 2017. Eye blink count and eye blink duration analysis for deception detection; Eye blink count and eye blink duration analysis for deception detection. IEEE, Udupi, 23-229. https://doi.org/10.1109/ICACCI.2017.8125844.

Brano Glumac and François Des Rosiers. 2020. Practice briefing—Automated valuation models (AVMs): their role, their advantages and their limitations. Journal of Property Investment&Finance 39, 5 (2020), 481-491. https://doi.org/10.1108/JPIF-07-2020-0086.

Stefan Griesche Bosch, Mandy Dotzauer, Stefan Griesche, Eric Nicolay, Dirk Assmann, and David Käthner. 2016. Should my car drive as I do? What kind of driving style do drivers prefer for the design of automated driving functions? Should my car drive as I do? What kind of driving style do drivers prefer for the design of automated driving functions? Soll mein Aut. raunschweiger Symposium 10, 11 (2016), 185-204. https://www.researchgate.net/publication/294087276.

Franziska Hartwich, Matthias Beggiato, and Josef F Krems. 2018. Driving Comfort, Enjoyment, and Acceptance of Automated Driving—Effects of Drivers' Age and Driving Style Familiarity. Ergonomics 0139 (2018), 0-1. https://doi.org/10.1080/00140139.2018.1441448.

Jesper F. Hopstaken, Dimitri van der Linden, Arnold B. Bakker, and Michiel A.J. Kompier. 2015. The window of my eyes: Task disengagement and mental fatigue covary with pupil dynamics. Biological Psychology 110 (Sep. 2015), 100-106. https://doi.org/10.1016/J.BIOPSYCHO.2015.06.013.

Zhongxu Hu, Chen Lv, Peng Hang, Chao Huang, and Yang Xing. 2021. Data-driven Estimation of Driver Attention using Calibration-free Eye Gaze and Scene Features. IEEE Transactions on Industrial Electronics 69, 2 (2021), 1800-1808. https://doi.org/10.1109/TIE.2021.3057033.

Keunwoo Kim, Minjung Park, and Youn Kyung Lim. 2021. Guiding Preferred Driving Style Using Voice in Autonomous Vehicles: An On-Road Wizard-of-Oz Study. In Designing Interactive Systems Conference 2021. Association for Computing Machinery, Inc, Virtual, 352-364. https://doi.org/10.1145/3461778.3462056.

Victor L. Knoop, Meng Wang, Isabel Wilmink, D. Marika Hoedemaeker, Mark Maaskant, and Evert Jeen Van der Meer. 2019. Platoon of SAE Level-2 Automated Vehicles on Public Roads: Setup, Traffic Interactions, and Stability. Transportation Research Record 9 (2019), 311-322. https://doi.org/10.1177/0361198119845885.

John D. Lee and Katrina A. See. 2004. Trust in Automation: Designing for Appropriate Reliance. Human Factors and Ergonomics Society 46, 1 (2004), 50-80.

David G. Lowe. 2004. Distinctive Image Features from Scale-Invariant Keypoints. International Journal of Computer Vision 2004 60:2 60, 2 (Nov. 2004), 91-110. https://doi.org/10.1023/B:VISI.0000029664.99615.94.

Zheng Ma and Yiqi Zhang. 2021. Drivers trust, acceptance, and takeover behaviors in fully automated vehicles: Effects of automated driving styles and driver's driving styles. Accident Analysis & Prevention 159 (Sep. 2021), 106238. https://doi.org/10.1016/J.AAP.2021.106238.

Marius Muja and David G Lowe. 2009. Fast Approximate Nearest Neighbors With Automatic Algorithm Configuration. Visapp 1, 2 (2009), 331-340.

Manisha Natarajan, Kumar Akash, and Teruhisa Misu. 2022. Toward Adaptive Driving Styles for Automated Driving with Users' Trust and Preferences. In In Proceedings of the 2022 ACM/IEEE International Conference on Human-Robot Interaction. IEEE, Hokkaido, 940-944.

Fabian Pedregosa, Gael Varoquaux, Alexandre Gramfort, Vincent Michel, Bertrand Thirion, Olivier Grisel, Mathieu Blondel, Peter Prettenhofer, Ron Weiss, Vincent Dubourg, Jake Vanderplas, Alexandre Passos, David Cournapeau, Matthieu Brucher, Matthieu Perrot, and Édouard Duchesnay. 2011. Scikit-learn: Machine learning in Python. Journal of Machine Learning Research 12 (2011), 2825-2830.

Rachel Phinnemore, Gabriele Cimolino, Pritam Sarkar, Ali Etemad, and T. C.Nicholas Graham. 2021. Happy Driver: Investigating the Effect of Mood on Preferred Style of Driving in Self-Driving Cars. In In Proceedings of the 9th International Conference on Human-Agent Interaction. ACM, Virtual, 139-147. https://doi.org/10.1145/3472307.3484169.

PPS. 2022. TactileGlove. https://pressureprofile.com/body-pressure-mapping/tactile-glove.

Christina M. Rudin-Brown and Heather A. Parker. 2004. Behavioural adaptation to adaptive cruise control (ACC): implications for preventive strategies. Transportation Research Part F: Traffic Psychology and Behaviour 7, 2 (Mar. 2004), 59-76. https://doi.org/10.1016/J.TRF.2004.02.001.

Shimmer. 2022. Shimmer3 GSR+ Unit. https://shimmersensing.com/product/shimmer3-gsr-unit/.

Sónia Soares, António Lobo, Sara Ferreira, Liliana Cunha, and António Couto. 2021. Takeover performance evaluation using driving simulation: a systematic review and meta-analysis. European Transport Research Review 13 (2021), 1-18. https://doi.org/10.1186/s12544-021-00505-2.

Tobii. 2022. Tobii Pro Glasses 3. https://www.tobiipro.com/product-listing/tobii-pro-glasses-3/.

Julia Trabulsi, Kian Norouzi, Seidi Suurmets, Mike Storm, and Thomas Zoëga Ramsøy. 2021. Optimizing Fixation Filters for Eye-Tracking on Small Screens. Frontiers in Neuroscience 15 (Nov. 2021), 1257. https://doi.org/10.3389/FNINS.2021.578439/BIBTEX.

J. L. Andreassi, Psychophysiology: Human behavior and physiological response. Psychology Press, 2010.

S. E. Baek, H. S. Kim, and M. Han, "Personalized speed planning algorithm using a statistical driver model in car-following situations," International Journal of Automotive Technology, vol. 23, No. 3, pp. 829-840, 2022.

T. Chen, S. Kornblith, M. Norouzi, and G. Hinton, "A simple framework for contrastive learning of visual representations," in International conference on machine learning. PMLR, 2020, pp. 1597-1607.

D. Chicco, "Siamese neural networks: An overview," Artificial Neural Networks, pp. 73-94, 2021.

D. Chung, K. Tahboub, and E. J. Delp, "A two stream siamese convolutional neural network for person re-identification," in Proceedings of the IEEE international conference on computer vision, 2017, pp. 1983-1991.

E. de Gelder, I. Cara, J. Uittenbogaard, L. Kroon, S. van Iersel, and J. Hogema, "Towards personalised automated driving: Prediction of preferred acc behaviour based on manual driving," in 2016 IEEE Intelligent Vehicles Symposium (IV). IEEE, 2016, pp. 1211-1216.

(56) References Cited

OTHER PUBLICATIONS

N. Du, F. Zhou, E. M. Pulver, D. M. Tilbury, L. P. Robert, A. K. Pradhan, and X. J. Yang, "Examining the effects of emotional valence and arousal on takeover performance in conditionally automated driving," Transportation research part C: emerging technologies, vol. 112, pp. 78-87, 2020.
J. B. Greenblatt and S. Shaheen, "Automated vehicles, on-demand mobility, and environmental impacts," Current sustainable/renewable energy reports, vol. 2, No. 3, pp. 74-81, 2015.
W. Hayale, P. Negi, and M. Mahoor, "Facial expression recognition using deep siamese neural networks with a supervised loss function," in 2019 14th IEEE International Conference on Automatic Face & Gesture Recognition (FG 2019). IEEE, 2019, pp. 1-7.
S.-C. Hsiao, D.-Y. Kao, Z.-Y. Liu, and R. Tso, "Malware image classification using one-shot learning with siamese networks," Procedia Computer Science, vol. 159, pp. 1863-1871, 2019.
S.-A. Kaye, S. Nandavar, S. Yasmin, I. Lewis, and O. Oviedo-Trespalacios, "Consumer knowledge and acceptance of advanced driver assistance systems," Transportation Research Part F: Traffic Psychology and Behaviour, vol. 90, pp. 300-311, 2022.
D. P. Kingma and J. Ba, "Adam: A method for stochastic optimization," arXiv preprint arXiv: 1412.6980, 2014.
V. K. Kukkala, J. Tunnell, S. Pasricha, and T. Bradley, "Advanced driver-assistance systems: A path toward autonomous vehicles," IEEE Consumer Electronics Magazine, vol. 7, No. 5, pp. 18-25, 2018.
C. Lee, B. Seppelt, B. Reimer, B. Mehler, and J. F. Coughlin, "Acceptance of vehicle automation: Effects of demographic traits, technology experience and media exposure," in Proceedings of the Human Factors and Ergonomics Society Annual Meeting, vol. 63. SAGE Publications Sage CA: Los Angeles, CA, 2019, pp. 2066-2070.
Y. Y. Lee, M. Dong, V. Krishnamoorthy, K. Akash, Z. Zheng, T. Misu, and G. Huang, "The impacts of adaptive driving styles on trust in level 2 automated vehicles," in Proceedings of the Human Factors and Ergonomic Society annual meeting, vol. 66, No. 1. SAGE Publishing, 2022, pp. 345-345.
B. C. Lee and V. G. Duffy, "The effects of task interruption on human performance: A study of the systematic classification of human behavior and interruption frequency," Human Factors and Ergonomics in Manufacturing & Service Industries, vol. 25, No. 2, pp. 137-152, 2015.
S. Mai, H. Hu, and S. Xing, "Divide, conquer and combine: Hierarchical feature fusion network with local and global perspectives for multimodal affective computing," in Proceedings of the 57th annual meeting of the association for computational linguistics, 2019, pp. 481-492.
B. Moradi, "The new optimization algorithm for the vehicle routing problem with time windows using multi-objective discrete learnable evolution model," Soft Computing, vol. 24, No. 9, pp. 6741-6769, 2020.
I. Nastjuk, B. Herrenkind, M. Marrone, A. B. Brendel, and L. M. Kolbe, "What drives the acceptance of autonomous driving? an investigation of acceptance factors from an end-user's perspective," Technological Forecasting and Social Change, vol. 161, p. 120319, 2020.
Y. Niu, D. Kong, R. Wen, Z. Cao, and J. Xiao, "An improved learnable evolution model for solving multi-objective vehicle routing problem with stochastic demand," Knowledge-Based Systems, vol. 230, p. 107378, 2021.

Z. Sajedinia, K. Akash, Z. Zheng, T. Misu, M. Dong, V. Krishnamoorthy, K. Martinez, K. Sureshbabu, and G. Huang, "Investigating users' preferences in adaptive driving styles for level 2 driving automation", in 14th International Conference on Automotive User Interfaces and Interactive Vehicular Applications, 2022, pp. 162-170.
Jarrod M Snider, "Automatic Steering Methods for Autonomous Automobile Path Tracking", Feb. 2009, Carnegie Mellon University (Year: 2009).
M. Teste, A. Broutin, M. Marty, M. C. Valéra, F. Soares Cunha, and E. Noirrit-Esclassan. 2021. Toothbrushing in children with autism spectrum disorders: qualitative analysis of parental difficulties and solutions in France. European Archives of Paediatric Dentistry 22, 6 (2021), 1049-1056. https://doi.org/10.1007/s40368-021-00640-3.
A. Ullah, K. Muhammad, K. Haydarov, I. U. Haq, M. Lee, and S. W. Baik, "One-shot learning for surveillance anomaly recognition using siamese 3d cnn," in 2020 International Joint Conference on Neural Networks (IJCNN). IEEE, 2020, pp. 1-8.
F. Wang and H. Liu, "Understanding the behaviour of contrastive loss," in Proceedings of the IEEE/CVF conference on computer vision and pattern recognition, 2021, pp. 2495-2504.
L. Yue, M. Abdel-Aty, Y. Wu, and L. Wang, "Assessment of the safety benefits of vehicles' advanced driver assistance, connectivity and low level automation systems," Accident Analysis & Prevention, vol. 117, pp. 55-64, 2018.
N. Zeghidour, G. Synnaeve, N. Usunier, and E. Dupoux, "Joint learning of speaker and phonetic similarities with siamese networks." in Interspeech, 2016, pp. 1295-1299.
C. Zhang, W. Liu, H. Ma, and H. Fu, "Siamese neural network based gait recognition for human identification," in 2016 ieee international conference on acoustics, speech and signal processing (ICASSP). IEEE, 2016, pp. 2832-2836.
Z. Zheng, K. Akash, T. Misu, V. Krishnamoorthy, M. Dong, Y. Lee, and G. Huang, "Identification of adaptive driving style preference through implicit inputs in sae l2 vehicles," in Proceedings of the 2022 International Conference on Multimodal Interaction, 2022, pp. 468-475.
Z. K. Zheng, J. E. Staubitz, A. S. Weitlauf, J. Staubitz, M. Pollack, L. Shibley, M. Hopton, W. Martin, A. Swanson, p. Juárez, et al., "A predictive multimodal framework to alert caregivers of problem behaviors for children with asd (premac)," Sensors, vol. 21, No. 2, p. 370, 2021.
Z. K. Zheng, K. Akash, and T. Misu, "Detection of perceived discomfort in sae l2 automated vehicles through driver takeovers and physiological spikes," in 2022 IEEE 25th International Conference on Intelligent Transportation Systems (ITSC). IEEE, 2022, pp. 1717-1722.
K. H. Zou, J. R. Fielding, S. G. Silverman, and C. M. Tempany, "Hypothesis testing i: proportions," Radiology, vol. 226, No. 3, pp. 609-613, 2003.
Office Action of U.S. Appl. No. 17/510,284 dated Jul. 28, 2023, 24 pages.
Office Action of U.S. Appl. No. 17/510,284 dated Nov. 2, 2023, 23 pages.
Notice of Allowance of U.S. Appl. No. 17/510,284 dated Feb. 14, 2024, 7 pages.
Office Action of U.S. Appl. No. 17/510,284 dated May 12, 2023, 45 pages.
Office Action of U.S. Appl. No. 18/077,904 dated Sep. 20, 2024, 34 pages.
Notice of Allowance of U.S. Appl. No. 18/077,904 dated Jan. 3, 2025, 19 pages.

\* cited by examiner

ADAPTIVE DRIVING STYLE

BACKGROUND

Driving features, such as adaptive cruise control (ACC), is getting more and more popular on existing vehicles. These features may bring improved convenience and fuel efficiency to individuals and to society. The acceptance and trust of driving features remain a factor. However, users may turn off these features if they do not prefer the control behavior and driving styles provided.

BRIEF DESCRIPTION

According to one aspect, an adaptive driving style system may include a set of two or more sensors, a memory, and a processor. The set of two or more sensors may receive two or more sensor signals. The memory may store one or more instructions. The processor may execute one or more of the instructions stored on the memory to perform one or more acts, actions, or steps, including training a trust model using two or more of the sensor signals as input, training a preference model using the trust model and two or more of the sensor signals as input, and generating a driving style preference based on an adaptive driving style model including the trust model and the preference model.

A sensor of two or more of the sensors may be an eye gaze sensor, a physiological sensor, a grip sensor, or an image capture device. The two or more sensor signals may be received from a set of users subjected to a driving simulation or a controlled driving environment. The processor may train the trust model using two or more of the sensor signals and a set of ground-truth preferences from the set of users as input. The processor may train the preference model using two or more of the sensor signals, the trust model, and a set of ground-truth preferences from the set of users as input.

The two or more sensor signals may be grouped into one or more training portions and a validation portion. The processor may train the trust model using one or more of the training portions. One or more of the training portions may be grouped into one or more training sub-portions and a classification sub-portion. The processor may train the trust model using one or more of the training sub-portions. The trust model may be utilized to classify or label the classification sub-portion based on the one or more training sub-portions. After classification of the classification sub-portion, the processor reassigns one or more of the training sub-portions as the classification sub-portion and may train the trust model using one or more of the training sub-portions until each of the sub-portions has been designated as the classification sub-portion at least once. The validation portion may be utilized to validate the preference model.

According to one aspect, a computer-implemented adaptive driving style method may include receiving two or more sensor signals from a set of two or more sensors, training a trust model using two or more of the sensor signals as input, training a preference model using the trust model and two or more of the sensor signals as input, and generating a driving style preference based on an adaptive driving style model including the trust model and the preference model.

A sensor of two or more of the sensors may be an eye gaze sensor, a physiological sensor, a grip sensor, or an image capture device. The two or more sensor signals may be received from a set of users subjected to a driving simulation or a controlled driving environment. The computer-implemented adaptive driving style method may include training the trust model using two or more of the sensor signals and a set of ground-truth preferences from the set of users as input. The computer-implemented adaptive driving style method may include training the preference model using two or more of the sensor signals, the trust model, and a set of ground-truth preferences from the set of users as input. The two or more sensor signals may be grouped into one or more training portions and a validation portion and the computer-implemented adaptive driving style method may include training the trust model using one or more of the training portions.

According to one aspect, an adaptive driving style system may include a set of two or more runtime sensors, a storage drive, a memory, a processor, and a controller. The set of two or more runtime sensors may receive two or more runtime sensor signals. The storage drive may store an adaptive driving style model. The memory may store one or more instructions. The processor may execute one or more of the instructions stored on the memory to perform one or more acts, actions, or steps, including generating a runtime driving style preference using the adaptive driving style model and two or more of the runtime sensor signals. The adaptive driving style model may be trained by training a trust model using two or more of the sensor signals as input, training a preference model using the trust model and two or more of the sensor signals as input, and generating a driving style preference based on an adaptive driving style model including the trust model and the preference model. The controller may implement the runtime driving style preference via one or more vehicle systems. A sensor of two or more of the sensors may be an eye gaze sensor, a physiological sensor, a grip sensor, or an image capture device. A runtime sensor of two or more of the runtime sensors may be an eye gaze sensor, a physiological sensor, a grip sensor, or an image capture device. The two or more sensor signals may be received from a set of users subjected to a driving simulation or a controlled driving environment.

DETAILED DESCRIPTION

Figure 1:
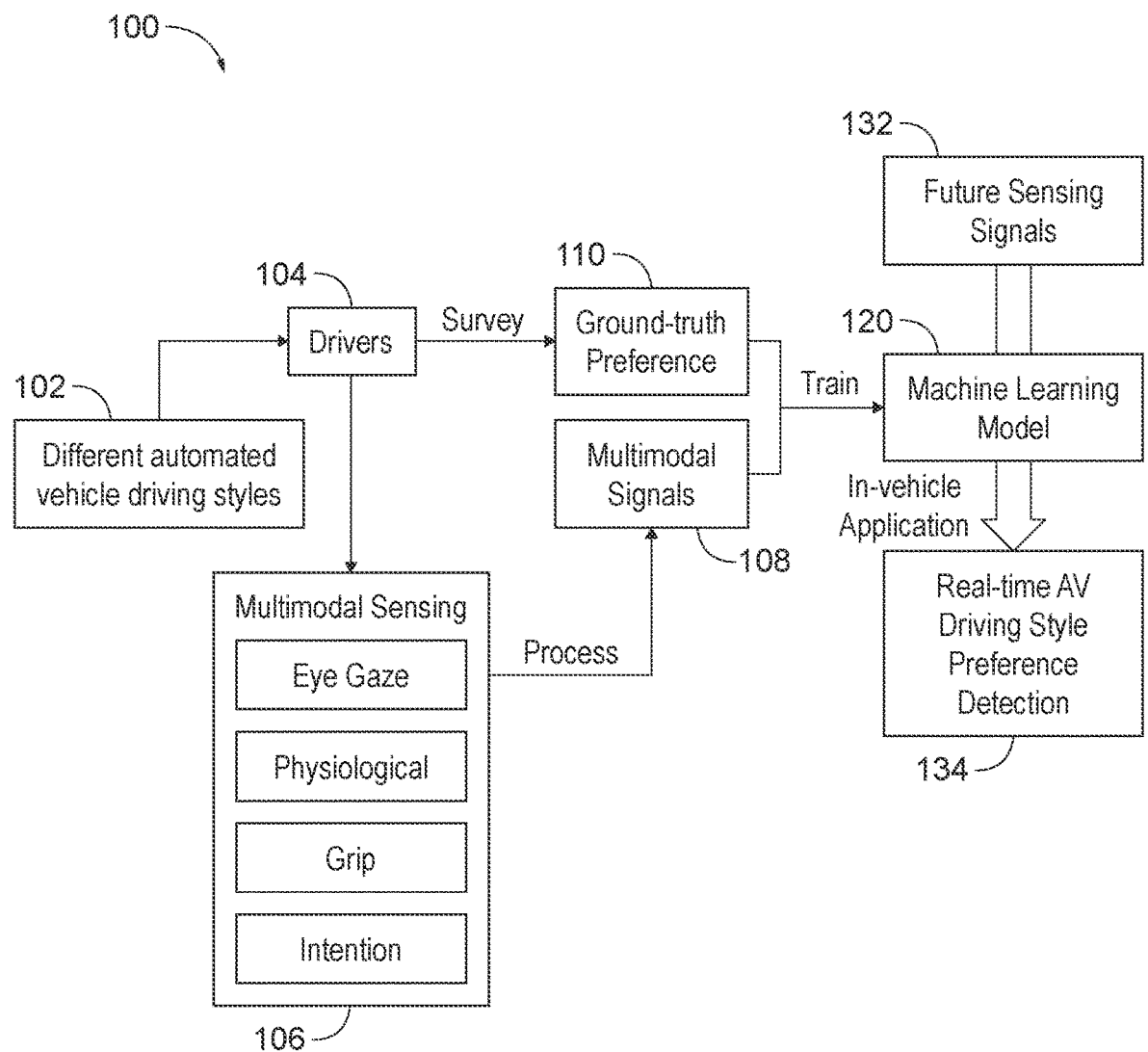
FIG. 1 is an exemplary flow diagram of a computer-implemented adaptive driving style method, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted, or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, portable electronic devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, and/or driving. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable, and non-removable media implemented in any method or technology for storage of information such as computer readable instructions, data structures, modules, or other data.

Acceptance of automated vehicle features by a user may be based on how closely the driving style provided matches the user's desired driving style. Mismatches between the automated and the driver preferred driving styles may cause users to take over more frequently or even disable the automation features. Driving style may be summarized as observable patterns of parameter sets related to the maneuver and trajectory planning and the preferred driving style may be a factor to drivers' trust and comfort. Younger drivers experienced the familiar driving style as more comfortable than the unfamiliar driving styles, but this effect was opposite for older drivers, who experienced more comfort with an unfamiliar driving style. Existing studies demonstrate that a variety of factors may contribute to the preferred driving style, including driver affective state, situation, and scenarios, which indicate that there may be no unique driving style matched to each individual and optimal driving style may vary depending on situations. Therefore, an adaptive driving style system may be desirable.

This disclosure provides identification of user driving style preference using multimodal signals as input. In this way, vehicles equipped with autonomous features may match user preference in a continuous and automatic fashion. The adaptive driving style provided herein may adjust driving styles according to one or more factors in a real-time and in an individualized manner. Additionally, the adaptive driving style may identify a user's preferred driving style in a continuous and automatic manner, without relying on explicit inputs on driving styles from the users.

FIG. 1 is an exemplary flow diagram of a computer-implemented adaptive driving style method 100, according to one aspect. Different types of automated vehicle driving styles may be defined at 102. At 104, different drivers or users may be subjected to a simulation environment or a controlled driving environment where the different drivers experience the different types of automated vehicle driving styles. At 106, a variety of sensor data may be collected from the drivers during this simulation phase. In other words, a driving simulator study where extensive multimodal data including behavioral, physiological, and situational data, may be performed.

The sensor data may be processed or pre-processed into multimodal signals at 108. These signals from the sensors may receive implicit data, which is not explicitly requested from the user or the driver. Additionally, ground-truth preference data may be received from the drivers or users (e.g., self identification of driving style or driving preferences) at 110. In this way, an adaptive driving style system may generate an adaptive driving style model 120.

The adaptive driving style model 120 may be utilized, in an execution phase, to provide a runtime driving style preference. For example, runtime sensor signals 132 may be provided to the adaptive driving style model 120, which may be utilized to generate the runtime driving style preference 134 in real-time.

Figure 2:
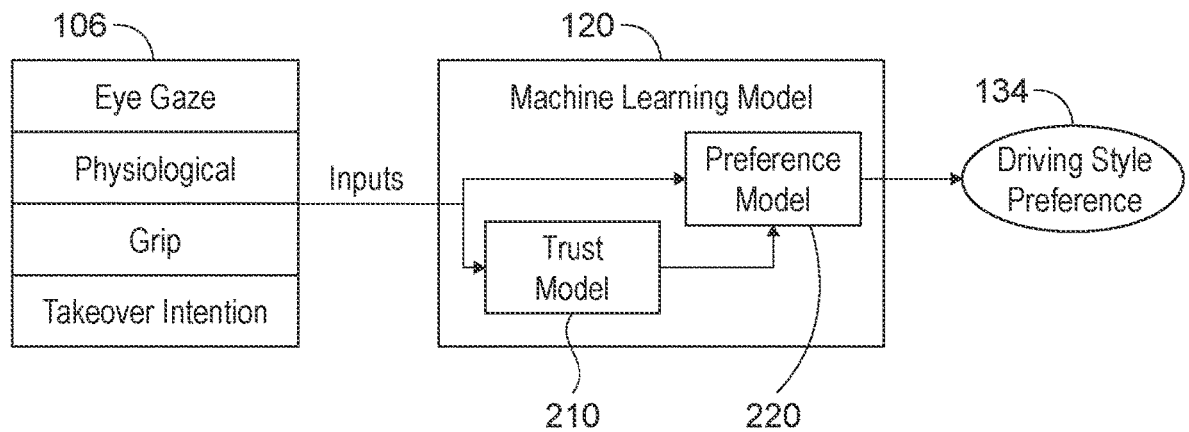
FIG. 2 is an exemplary component diagram of a machine-learning model associated with generating an adaptive driving style model, according to one aspect.

FIG. 2 is an exemplary component diagram of a machine-learning model associated with generating an adaptive driving style model, according to one aspect. As seen in FIG. 2, the inputs from the sensors or sensor data, may be provided to the adaptive driving style model 120. The adaptive driving style model 120 may include a trust modeler 210 and a preference modeler 220 and be trained using a two-step process, discussed in greater detail below. The trust model 210 may be utilized to train the preference model 220.

Figure 3:
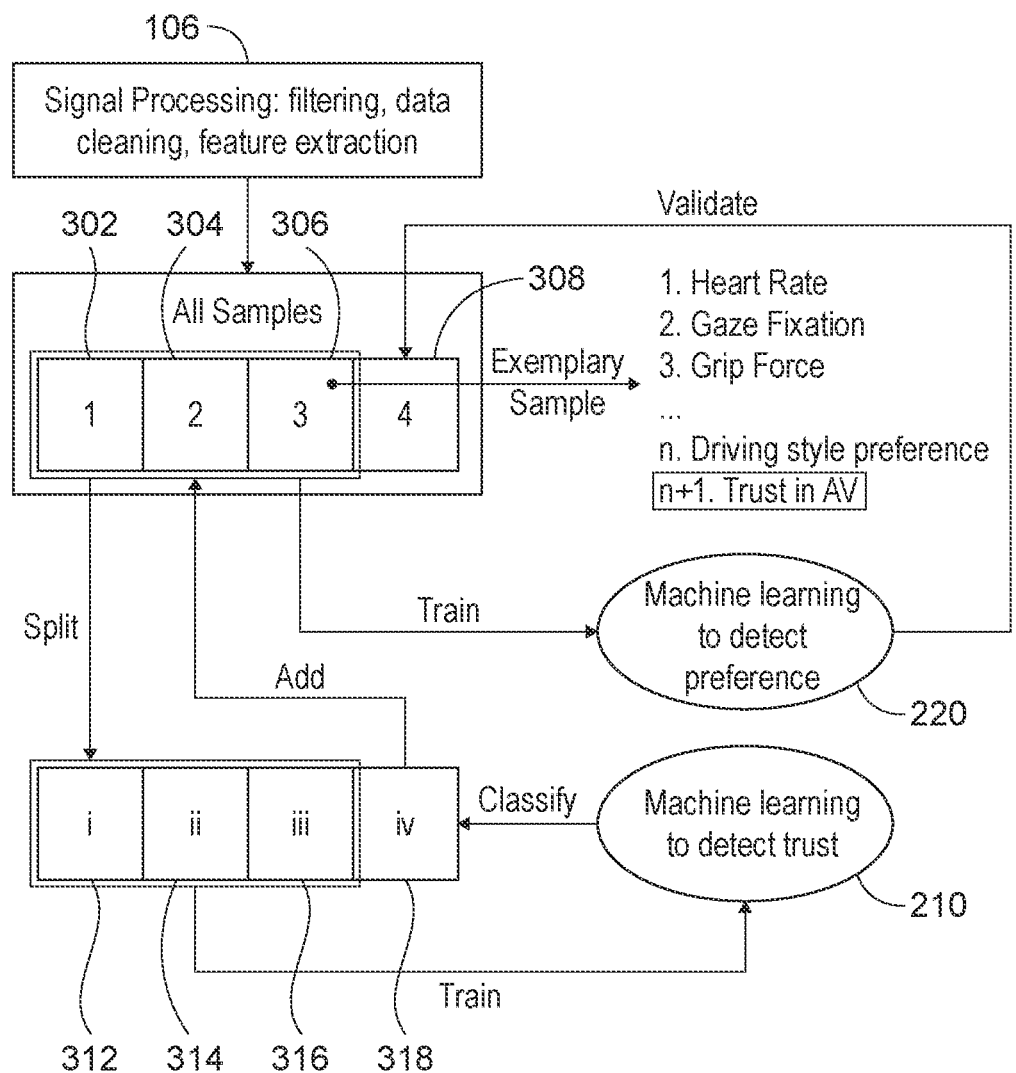
FIG. 3 is an exemplary flow diagram of a computer-implemented adaptive driving style method, according to one aspect.

FIG. 3 is an exemplary flow diagram of a computer-implemented adaptive driving style method, according to one aspect. As seen in FIG. 3, the sensor data which was processed or pre-processed into multimodal signals (and may also include the ground truth data) at 108 may be divided or grouped into one or more training portions 302, 304, 306 and a validation portion 308. The one or more training portions 302, 304, 306 may then be further divided or grouped into one or more training sub-portions 312, 314, 316 and a classification sub-portion 318.

Figure 4:
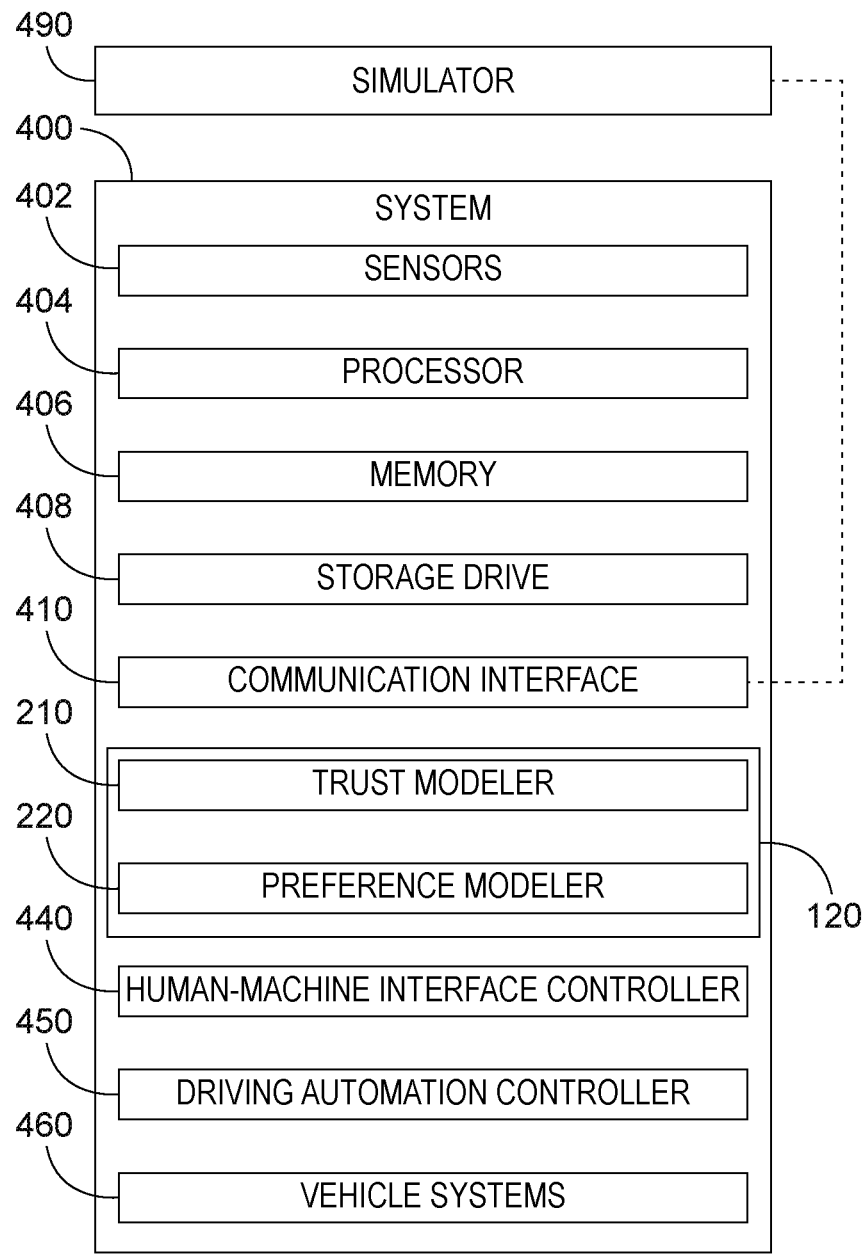
FIG. 4 is an exemplary component diagram of an adaptive driving style system, according to one aspect.

FIG. 4 is an exemplary component diagram of an adaptive driving style system 400, according to one aspect. The adaptive driving style system 400 may include a simulator or may not include a simulator 490. The adaptive driving style system 400 may include a set of two or more sensors 402 (e.g., which may be used as runtime sensors during the execution phase), a processor 404, a memory 406, a storage drive 408, a communication interface 410, and an adaptive driving style modeler 120. The adaptive driving style modeler 120 may include a trust modeler 210 and a preference modeler 220. The adaptive driving style system 400 may include a human-machine interface controller 440, a driving automation controller 450, and one or more vehicle systems 460. One or more of the aforementioned components of the adaptive driving style system 400 may be interconnected via one or more busses, be operably connected, and/or in computer communication with one another. Further, it is contemplated that one or more of the sensors 402 may be located on a mobile device which may be in computer communication or in wireless communication with the adaptive driving style system 400. The memory may store one or more instructions. The processor 404 may execute one or more of the instructions stored on the memory to perform one or more acts, actions, or steps.

The set of two or more sensors 402 may receive two or more sensor signals, respectively. A sensor of two or more of the sensors 402 may be an eye gaze sensor including micro eye cameras, a physiological sensor, a heart rate sensor, a grip sensor, a grip force sensor (e.g., pressure sensing glove embedded with sensing elements, etc.), an image capture device, pedal distance sensor (e.g., monitoring distance of the user foot to a target pedal), a wearable sensor, an integrated sensor, a sensor on the vehicle recording driving maneuvers, brake inputs, throttle inputs, a sensor mounted to the steering wheel, on a mobile device, etc. In this way, the sensors 402, which may be wireless and/or battery powered may provide behavioral, physiological, or situational data as multimodal data pertaining to users or drivers and this data may be utilized to detect or predict a driving style preference.

Behavioral data may include eye gaze data, grip data, maneuvering data from the vehicle, pedal distance between a user's foot and a pedal of the vehicle or detected driver's physical behaviors. Maneuver features may be extracted from the CAN-Bus signals, including throttle, brake, and steering wheel angles. Physiological data may include pupil size or diameter, galvanic skin response (GSR) as how well the skin conduct electricity or how much sweat an individual has, electrocardiogram (ECG), heart rate variability (HRV) as a standard deviation of inter heart beat intervals, peripheral data, heart rate, skin conductance responses (SCR), etc. Situational data may include gaze semantics or drive data (e.g., current aggressiveness level, event type, and takeovers) that may be the human perception of the surroundings and the driving task. Takeover intention may be measured using integrated non-contact distance detection sensors on the throttle and brake pedals, such as ultrasonic sound wave sensors.

Training Phase

During the simulation phase or the controlled driving phase, the signals received may be utilized for training a machine-learning model, such as the adaptive driving style model. The two or more sensor signals may be received from a set of users subjected to a driving simulation or a controlled driving environment. During the simulation phase, the training phase, or the controlled driving, users or participants may be subjected to pedestrian related events (e.g., pedestrians on the sidewalk, crossing at the crosswalk, at the intersection, walking at the intersection), vehicle or traffic related events (e.g., right turns at a red light, following a lead vehicle, yield and left turns, a two-way stop), or other scenarios where the users may be able to take over control of the vehicle from a driving feature, such as adaptive cruise control (ACC) or advanced driver assistance systems (ADAS). Drivers or users may be presented with the vehicle dashboard and the driving surrounding environment. The dashboard may be presented to include a speedometer, a navigation arrow, a target direction (e.g., left, right, straight), an indication of whether the driving automation is on or off. Takeover may be indicated during the simulation by the user pressing the throttle and brake pedals whenever takeover is desired by the user. For a given event, if the user or participant pressed any pedal, the pedal press may be annotated as a takeover for the brake and for the throttle pedal, respectively. The driving environment may be rendered (or a real, controlled environment), such as by simulating an urban area including traffic lights, other vehicles, pedestrian crossing intersections, road signs, roundabouts, etc.

Further, users may provide ground-truth preferences via a survey or a questionnaire. In other words, driver preference ground-truth may be from survey answers regarding preference change. Specifically, whether the users prefer to drive more defensively, prefer to drive the same, or prefer to drive more aggressively. Drivers may be classified into different driving styles, including highly aggressive (HA), less aggressive (LA), highly defensive (HD), or less defensive (LD). The driving features or driving assistance may be classified into different automated driving styles, including fixed less aggressive (LA), fixed less defensive (LD), trust-base less defensive (trustLD), trust-based less aggressive (trustLA), preference based less defensive (prefLD), preference based less aggressive (prefLA).

Drivers or users may be presented with the vehicle dashboard and the driving surrounding environment and automated driving may be implemented using an intelligent driver model (IDM) and a Stanley controller based on one or more predefined parameters. Different driving style adaptations may be presented or provided to the users during simulation. For example, two fixed driving style adaptations may use the LA and the LD driving styles throughout the events of a driving session. For the four sessions of adaptive driving styles, two may include trust-based adaptation and the other two may include preference-based adaptation. The simulator may adaptively chose driving aggressiveness from the above-mentioned four levels based on user feedback during the simulation.

In the trust-based adaptive mode, the driving style may be changed based on a single-item survey that measures the change of trust in the system. According to one aspect, a survey question may be presented on the screen. The user may be provided with five options: greatly increase (+2); slightly increase (+1), stay the same (0), slightly decrease (−1), and greatly decrease (−2). For each selection the users made, the simulator recorded the numeric value. Once the accumulative values changed by 2, the driving style would change, where accumulative +2 and −2 would lead the driving style to be more aggressive and more defensive, respectively. In this way, trust change may be measured as a numerical value.

Similarly, for the preference-based adaptive mode, the driving style would change based on the preference measurement survey on the screen, and each change from the previous selection would result in a change in the driving style. According to one aspect, three options may be provided on users' preferred driving style: drive more aggressively, stay the same, or drive more defensively. For example, if a user chooses "drive more defensively" when the vehicle driving style is LD, then the driving style drops one level to be HD. Finally, the fixed mode may be the baseline as either the LD or LA driving style. The trust-based and preference-based adaptive drives may start with LD or LA as an initial driving style. This results in six automated driving styles: fixedLD, fixedLA, trustLD, trustLA, prefLD, and prefLA, although fewer or more driving styles are contemplated.

The sensor data may include extracted timestamps for each corresponding event and pre-processing, cleaning, interpolation, and normalization may be performed. Eye gaze points outside a simulator screen may be purged. Missing data samples from eye gaze and pupil size may be interpolated using nearest-neighbor interpolation. Linear interpolation may be used to replace missing pedal distance signals. Since physiological features and grip forces may vary across different individuals, Z-normalization may be performed (e.g., $Z(x)=x-\mu/\sigma$).

According to one aspect, semantic segmentation based gaze features may be incorporated and objects which users are gazing at may be annotated and the model may be trained accordingly. Eye gaze semantics information (e.g., the type of object the user may be looking at on the scene) may represent driver situation awareness understanding. According to one aspect, semantic labeling for eye gaze data for each frame of a video using semantic segmentation of the driving scene video frames may be performed. A library may train the model and apply the library to predict semantics information from the experimental collected RGB frames. With the eye gaze position on the simulator scenes, the processor 404 may identify a category of object the users is looking at, and also the percentage of fixation on different objects. Entropy of fixations of different objects may be computed (e.g., $H=\Sigma_{i=1}^{n} p_i \log_2 p_i$). Feature extraction may be performed on each event to form samples. The drive features may include a current aggressiveness level of the automated drive, an event type which is one of pedestrian-related or vehicle-related, and a takeover intention or action on throttle and brakes.

With reference to FIG. 3, the processor 404 may train a trust model using two or more of the sensor signals and a set of ground-truth preferences from the set of users as input. During the training phase, the two or more sensor signals (e.g., multimodal data) may be grouped into one or more training portions 302, 304, 306 (e.g., training set) and a validation portion 308 (e.g., test set). The processor 404 may train the trust model using one or more of the training portions 302, 304, 306.

Trust may be an important factor toward preference in automated drives and machine learning detection. Thus, the system may use the trust as an intermediate factor for preference identification. Accordingly, the processor 404 may train a preference model using the trust model and two or more of the sensor signals (e.g., training portions 302, 304, 306) and the set of ground-truth preferences from the set of users as input. In this way, the training of the machine-learning model may be provided using two-step prediction, which provides enhanced or increase accuracy. In other words, the preference model may be built based on the trust model or once it is determined that a sufficient level of trust exists. The validation portion 308 may be utilized to validate the preference model.

According to one aspect, for the cross validation for preference identification model, the training data may be separated into four portions (312, 314, 316, 318), and three user portions (312, 314, 316) used as training data for the trust model. The trust model may then classify trust changes and levels on the fourth portion (318).

Explained yet again, one or more of the training portions 302, 304, 306 may be grouped into one or more training sub-portions 312, 314, 316 (e.g., training set) and a classification sub-portion 318 (e.g., test set) and the processor 404 may train the trust model using one or more of the training sub-portions 312, 314, 316. The trust model may be utilized to classify or label, by detecting or estimating corresponding trust levels, the classification sub-portion 318 based on the one or more training sub-portions 312, 314, 316.

After classification of the classification sub-portion 318, the processor 404 may reassign (e.g., loop through) one or more of the training sub-portions as the classification sub-portion and may train the trust model using one or more of the training sub-portions until each of the sub-portions has been designated as the classification sub-portion at least once. For example, on the second pass, 312, 314, 318 may be designated as training sub-portions while 316 may be designated as the classification sub-portion. On the third pass, 312, 316, 318 may be designated as training sub-portions while 314 may be designated as the classification sub-portion. On the fourth pass, 314, 316, 318 may be designated as training sub-portions while 312 may be designated as the classification sub-portion. In this way, looping using four-four validation may occur, for example, and thus, the one or more training sub-portions may be classified or labeled by trust level accordingly. Similar procedure may be followed for the portions 302, 304, 306, 308.

The processor 404 may generate a driving style preference based on an adaptive driving style model including the trust model and the preference model. In this way, the adaptive driving style model may identify preferred driving styles.

According to one aspect, the multimodal data (e.g., from the sensors 402) and the set of ground-truth preferences may be fed into a random forest classifier to generate a preference detection for other participants. The random forest classifier may be from the scikitlearn library, for this three-class supervised classification problem.

Execution Phase

During the execution phase, the signals received (e.g., two or more runtime sensor signals) may be utilized for operating the machine-learning model or the adaptive driving style model to generate the runtime driving style preference. The storage drive of the adaptive driving style system 400 may store the adaptive driving style model, which may be received via the communication interface 410 and from the simulator 490. The processor 404 may generate a runtime driving style preference using the adaptive driving style model and two or more of the runtime sensor signals (e.g., multimodal signals or data). As previously discussed, the adaptive driving style model may be trained by training the trust model using two or more of the sensor signals as input, training the preference model using the trust model and two or more of the sensor signals as input, and generating the driving style preference based on the adaptive driving style model which includes the trust model and the preference model. Thus, the adaptive driving style model may identify driver preference on driving styles, from multimodal behavioral responses of drivers received from the sensors 402.

The controller or the driving automation controller 450 may implement the runtime driving style preference via one or more of the vehicle systems 460 and the human-machine interface controller 440 may provide alerts, such as via a display, audio alert, tactile alert, etc. to the user regarding the runtime driving style preference.

In this way, the adaptive driving style system 400 or associated computer-implemented adaptive driving style methods may provide the advantage or benefit of detection of driving style preference with implicit inputs, in an automatic and continuous manner, while validating detection in a controlled driving environment. Thus, investigation of which sensing modalities may contribute more towards preference detection may be achieved. Stated another way, the adaptive driving style system 400 may predict a change of user preferences using the multimodal data to detect driving styles preferences.

Figure 5:
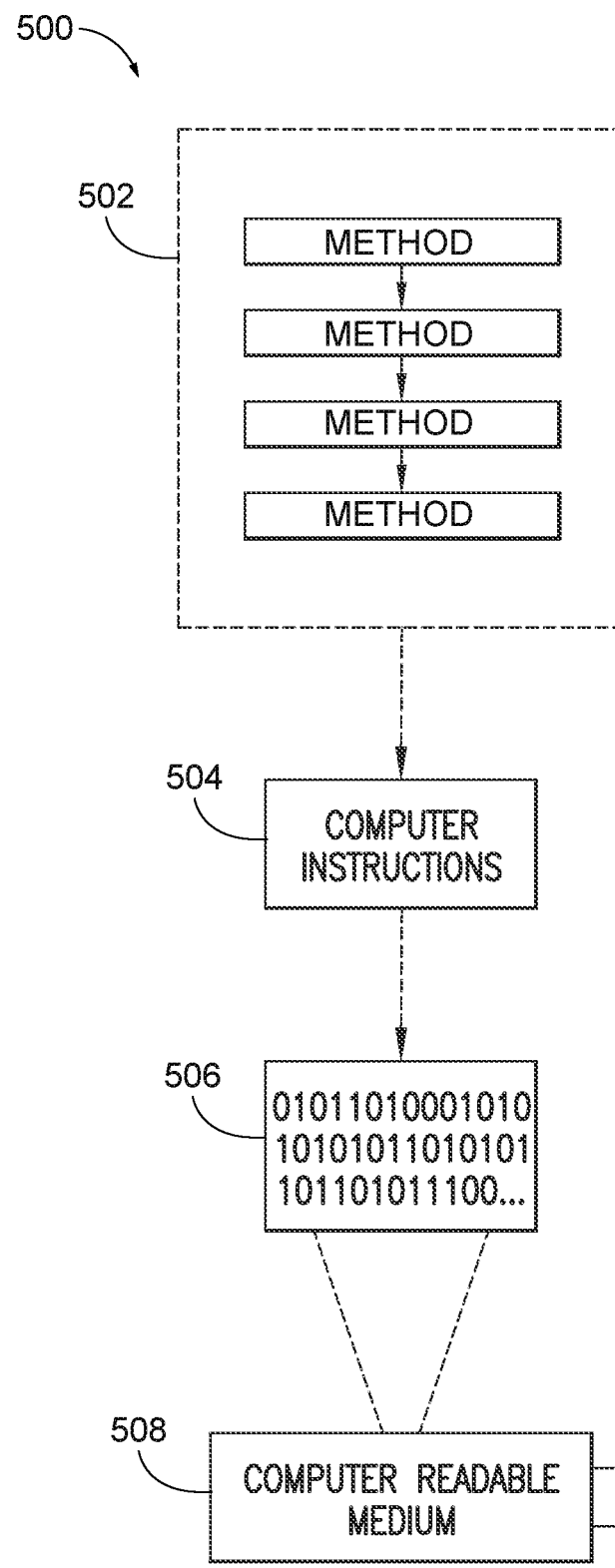
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the computer-implemented adaptive driving style method 100 of FIG. 1. In another aspect, the processor-executable computer instructions 504 may be configured to implement a system, such as the adaptive driving style system 400 of FIG. 4. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 6:
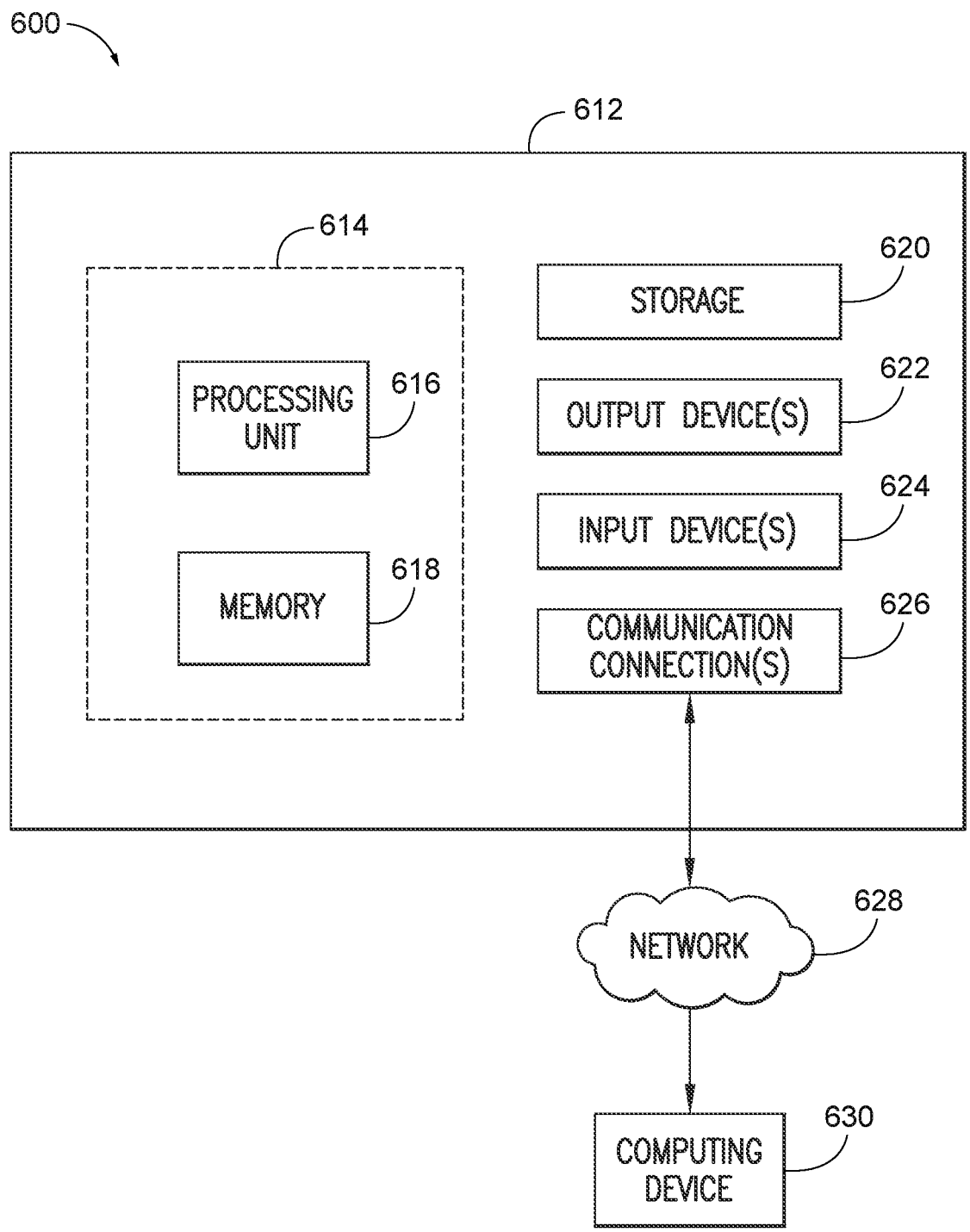
FIG. 6 is an illustration of an example computing environment where one or more of the provisions set forth herein are implemented, according to one aspect.

FIG. 6 and the following discussion provide a description of a suitable computing environment to implement aspects of one or more of the provisions set forth herein. The operating environment of FIG. 6 is merely one example of a suitable operating environment and is not intended to suggest any limitation as to the scope of use or functionality of the operating environment. Example computing devices include, but are not limited to, personal computers, server computers, handheld or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 6 illustrates a system 600 including a computing device 612 configured to implement one aspect provided herein. In one configuration, the computing device 612 includes at least one processing unit 616 and memory 618. Depending on the exact configuration and type of computing device, memory 618 may be volatile, such as RAM, non-volatile, such as ROM, flash memory, etc., or a combination of the two. This configuration is illustrated in FIG. 6 by dashed line 614.

In other aspects, the computing device 612 includes additional features or functionality. For example, the computing device 612 may include additional storage such as removable storage or non-removable storage, including, but not limited to, magnetic storage, optical storage, etc. Such additional storage is illustrated in FIG. 6 by storage 620. In one aspect, computer readable instructions to implement one aspect provided herein are in storage 620. Storage 620 may store other computer readable instructions to implement an operating system, an application program, etc. Computer readable instructions may be loaded in memory 618 for execution by the at least one processing unit 616, for example.

The term "computer readable media" as used herein includes computer storage media. Computer storage media includes volatile and nonvolatile, removable, and non-removable media implemented in any method or technology for storage of information such as computer readable instructions or other data. Memory 618 and storage 620 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 612. Any such computer storage media is part of the computing device 612.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 612 includes input device(s) 624 such as keyboard, mouse, pen, voice input device, touch input device, infrared cameras, video input devices, or any other input device. Output device(s) 622 such as one or more displays, speakers, printers, or any other output device may be included with the computing device 612. Input device(s) 624 and output device(s) 622 may be connected to the computing device 612 via a wired connection, wireless connection, or any combination thereof. In one aspect, an input device or an output device from another computing device may be used as input device(s) 624 or output device(s) 622 for the computing device 612. The computing device 612 may include communication connection(s) 626 to facilitate communications with one or more other devices 630, such as through network 628, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations, or improvements therein may be subsequently made by those skilled in the art which are also intended to be encompassed by the following claims.

The invention claimed is:

1. An adaptive driving style system, comprising:
a set of two or more sensors receiving two or more sensor signals grouped into one or more training portions and a validation portion, wherein one or more of the training portions is grouped into one or more training sub-portions and classification sub-portion;
a memory storing one or more instructions;
a processor executing one or more of the instructions stored on the memory to perform:
training a trust model using one or more of the training sub-portions as input, wherein the trust model is utilized to classify or label the classification sub-portion based on the one or more training sub-portions, wherein after classification of the classification sub-portion, the processor reassigns one or more of the training sub-portions as the classification sub-portion and trains the trust model using one or more of the training sub-portions until each of the sub-portions has been designated as the classification sub-portion at least once;

training a preference model using the trust model and two or more of the sensor signals as input; and generating a driving style preference based on an adaptive driving style model including the trust model and the preference model; and a controller controlling one or more of throttle, braking and steering of the vehicle in accordance with the driving style preference while the vehicle is controlled in an autonomous driving mode.

2. The adaptive driving style system of claim 1, wherein a sensor of two or more of the sensors is an eye gaze sensor, a physiological sensor, a grip sensor, or an image capture device.

3. The adaptive driving style system of claim 1, wherein the two or more sensor signals are received from a set of users subjected to a driving simulation or a controlled driving environment.

4. The adaptive driving style system of claim 3, wherein the processor trains the trust model using two or more of the sensor signals and a set of ground-truth preferences from the set of users as input.

5. The adaptive driving style system of claim 3, wherein the processor trains the preference model using two or more of the sensor signals, the trust model, and a set of ground-truth preferences from the set of users as input.

6. The adaptive driving style system of claim 1, wherein the validation portion is utilized to validate the preference model.

7. A computer-implemented adaptive driving style method, comprising:

receiving two or more sensor signals from a set of two or more sensors, wherein the two or more sensor signals are grouped into one or more training portions and a validation portion, wherein one or more of the training portions is grouped into one or more training sub-portions and a classification sub-portion;

training a trust model using one or more of the training sub-portions as input, wherein the trust model is utilized to classify or label the classification sub-portion based on the one or more training sub-portions, and after classification of the classification sub-portion, reassigning one or more of the training sub-portions as the classification sub-portion and training the trust model using one or more of the training sub-portions until each of the sub-portions has been designated as the classification sub-portion at least once;

training a preference model using the trust model and two or more of the sensor signals as input;

generating a driving style preference based on an adaptive driving style model including the trust model and the preference model; and controlling one or more of throttle, braking and steering of the vehicle in accordance with the driving style preference while the vehicle is controlled in an autonomous driving mode.

8. The computer-implemented adaptive driving style method of claim 7, wherein a sensor of two or more of the sensors is an eye gaze sensor, a physiological sensor, a grip sensor, or an image capture device.

9. The computer-implemented adaptive driving style method of claim 7, wherein the two or more sensor signals are received from a set of users subjected to a driving simulation or a controlled driving environment.

10. The computer-implemented adaptive driving style method of claim 9, comprising training the trust model using two or more of the sensor signals and a set of ground-truth preferences from the set of users as input.

11. The computer-implemented adaptive driving style method of claim 9, comprising training the preference model using two or more of the sensor signals, the trust model, and a set of ground-truth preferences from the set of users as input.

12. The computer-implemented adaptive driving style method of claim 7, wherein the two or more sensor signals are grouped into one or more training portions and a validation portion; and comprising training the trust model using one or more of the training portions.

13. An adaptive driving style system, comprising:

a set of two or more runtime sensors receiving two or more runtime sensor signals grouped into one or more training portions and a validation portion, wherein one or more of the training portions is grouped into one or more training sub-portions and a classification sub-portion;

a storage drive storing an adaptive driving style model;

a memory storing one or more instructions;

a processor executing one or more of the instructions stored on the memory to perform generating a runtime driving style preference using the adaptive driving style model and two or more of the runtime sensor signals;

wherein the adaptive driving style model is trained by:

training a trust model using one or more of the training sub-portions as input, wherein the trust model is utilized to classify or label the classification sub-portion based on the one or more training sub-portions, wherein after classification of the classification sub-portion, the processor reassigns one or more of the training sub-portions as the classification sub-portion and trains the trust model using one or more of the training sub-portions until each of the sub-portions has been designated as the classification sub-portion at least once;

training a preference model using the trust model and two or more of the runtime sensor signals as input; and generating a driving style preference based on an adaptive driving style model including the trust model and the preference model; and a controller controlling one or more of throttle, braking and steering of the vehicle in accordance with the driving style preference while the vehicle is controlled in an autonomous driving mode.

14. The adaptive driving style system of claim 13, wherein a runtime sensor of the two or more of the runtime sensors is an eye gaze sensor, a physiological sensor, a grip sensor, or an image capture device.

15. The adaptive driving style system of claim 13, wherein the two or more runtime sensor signals are received from a set of users subjected to a driving simulation or a controlled driving environment.

* * * * *